United States Patent
Raz et al.

(10) Patent No.: US 7,389,178 B2
(45) Date of Patent: Jun. 17, 2008

(54) SYSTEM AND METHOD FOR VEHICLE DRIVER BEHAVIOR ANALYSIS AND EVALUATION

(75) Inventors: Ofer Raz, Moshav Bnaya (IL); Hod Fleishman, Jerusalem (IL); Itamar Mulchadsky, Tel-Aviv (IL)

(73) Assignee: Greenroad Driving Technologies Ltd., Or Yehuda (IL)

( * ) Notice: Subject to any disclaimer, the term of this patent is extended or adjusted under 35 U.S.C. 154(b) by 698 days.

(21) Appl. No.: 10/894,345

(22) Filed: Jul. 20, 2004

(65) Prior Publication Data

US 2005/0131597 A1 Jun. 16, 2005

Related U.S. Application Data

(60) Provisional application No. 60/528,522, filed on Dec. 11, 2003.

(51) Int. Cl.
G01C 21/00 (2006.01)

(52) U.S. Cl. .................... 701/200; 701/29; 701/34; 701/36; 701/56; 340/903

(58) Field of Classification Search .............. 701/1, 701/29, 31, 33–34, 36, 56, 301; 340/438, 340/439, 903
See application file for complete search history.

(56) References Cited

U.S. PATENT DOCUMENTS

| | | |
|---|---|---|
| 4,500,868 A | 2/1985 | Tokitsu et al. |
| 4,671,111 A | 6/1987 | Lemelson |
| 5,270,708 A | 12/1993 | Kamishima et al. |
| 5,546,305 A | 8/1996 | Kondo |
| 5,570,087 A | 10/1996 | Lemelson |
| 5,805,079 A | 9/1998 | Lemelson |
| 6,060,989 A | 5/2000 | Gehlot |
| 6,438,472 B1 | 8/2002 | Tano et al. |
| 2002/0128751 A1* | 9/2002 | Engstrom et al. ............ 701/1 |
| 2007/0001831 A1* | 1/2007 | Raz et al. ............... 340/439 |

* cited by examiner

*Primary Examiner*—Gertrude A. Jeanglaude
(74) *Attorney, Agent, or Firm*—Browdy and Neimark

(57) ABSTRACT

A system and method for analyzing and evaluating the performance and attitude of a motor vehicle driver. A raw data stream from a set of vehicle sensors is filtered to eliminate extraneous noise, and then parsed to convert the stream into a string of driving event primitives. The string of driving events is then processed by a pattern-recognition system to derive a sequence of higher-level driving maneuvers. Driving maneuvers include such familiar procedures as lane changing, passing, and turn and brake. Driving events and maneuvers are quantified by parameters developed from the sensor data. The parameters and timing of the maneuvers can be analyzed to determine skill and attitude factors for evaluating the driver's abilities and safety ratings. The rendering of the data into common driving-related concepts allows more accurate and meaningful analysis and evaluation than is possible with ordinary statistical threshold-based analysis.

15 Claims, 14 Drawing Sheets

SYSTEM AND METHOD FOR VEHICLE DRIVER BEHAVIOR ANALYSIS AND EVALUATION

The present application claims benefit of U.S. Provisional Patent Application No. 60/528,522 filed Dec. 11, 2003.

FIELD OF THE INVENTION

The present invention relates to vehicle monitoring systems, and methods, and, more particularly, to systems and methods for monitoring and evaluating vehicle driver behavior.

BACKGROUND OF THE INVENTION

There are recognized benefits in having systems and methods to monitor the operation of vehicles, for capturing real-time data pertaining to driving activity and patterns thereof. Such systems and methods facilitate the collection of qualitative and quantitative information related to the contributing causes of vehicle incidents, such as accidents; and allow objective driver evaluation to determine the quality of driving practices. The potential benefits include preventing or reducing vehicle accidents and vehicle abuse; and reducing vehicle operating, maintenance, and replacement costs. The social value of such devices and systems is universal, in reducing the impact of vehicle accidents. The economic value is especially significant for commercial and institutional vehicle fleets, as well as for general insurance and risk management.

There exists a large and growing market for vehicle monitoring systems that take advantage of new technological advances. These systems vary in features and functionality and exhibit considerable scope in their approach to the overall problem. Some focus on location and logistics, others on engine diagnostics and fuel consumption, whereas others concentrate on safety management.

For example, U.S. Pat. No. 4,500,868 to Tokitsu et al. (herein denoted as "Tokitsu) is intended as an adjunct in driving instruction. By monitoring a variety of sensors (such as engine speed, vehicle velocity, selected transmission gear, and so forth), a system according to Tokitsu is able to determine if certain predetermined condition thresholds are exceeded, and, if so, to signal an alarm to alert the driver. Alarms are also recorded for later review and analysis. In some cases, a simple system such as Tokitsu can be valuable. For example, if the driver were to strongly depress the accelerator pedal, the resulting acceleration could exceed a predetermined threshold and sound an alarm, cautioning the driver to reduce the acceleration. If the driver were prone to such behavior, the records created by Tokitsu's system would indicate this. On the other hand, Tokitsu's system is of limited value under other conditions. For example, if the driver were to suddenly apply the vehicle brakes with great force, the resulting deceleration could exceed a predetermined threshold, and thereby signal an alarm and be recorded. Although the records of such behavior could be valuable, such strong braking is usually done under emergency conditions where the driver is already aware of the emergency, and where an alarm would be superfluous (and hence of little or no value), or perhaps distracting (and hence of dubious value or even detrimental).

U.S. Pat. No. 4,671,111 to Lemelson (herein denoted as "Lemelson 111") teaches the use of accelerometers and data recording/transmitting equipment for obtaining and analyzing vehicle acceleration and deceleration. Although Lemelson 111 presents this in the context of analyzing vehicle performance, however, there is no detailed discussion of precisely how an analysis of the resulting data would be done, nor how meaningful information could be obtained thereby. In related U.S. Pat. No. 5,570,087 also to Lemelson (herein denoted as "Lemelson 087") the analyzed vehicular motion is expressed in coded representations which are stored in computer memory. As with Lemelson 111, which does not describe how raw data is analyzed to determine driving behavior parameters, Lemelson 087 does not describe how coded representations of raw data or driving behavior parameters would be created or utilized. It is further noted that U.S. Pat. No. 5,805,079 to Lemelson (herein denoted as "Lemelson 079") is a continuation of Lemelson 087 and contains no new or additional descriptive material.

U.S. Pat. No. 5,270,708 to Kamishima (herein denoted as "Kamishima") discloses a system that detects a vehicle's position and orientation, turning, and speed, and coupled with a database of past accidents at the present location, determines whether the present vehicle's driving conditions are similar to those of a past accident, and if so, alerts the driver. If, for example, the current vehicle speed on a particular road exceeds the (stored) speed limit at that point of the road, the driver could be alerted. Moreover, if excessive speed on that particular area is known to have been responsible for many accidents, the system could notify the driver of this. The usefulness of such a system, however, depends critically on having a base of previous data and being able to associate the present driving conditions with the stored information. The Kamishima system, in particular, does not analyze driving behavior in general, nor draw any general conclusions about the driver's patterns in a location-independent manner.

U.S. Pat. No. 5,546,305 to Kondo (herein denoted as "Kondo") performs an analysis on raw vehicle speed and acceleration, engine rotation, and braking data by time-differentiating the raw data and applying threshold tests. Although such an analysis can often distinguish between good driving behavior and erratic or dangerous driving behavior (via a driving "roughness" analysis), time-differentiation and threshold detection cannot by itself classify raw data streams into the familiar patterns that are normally associated with driving. Providing a count of the number of times a driver exceeded a speed threshold, for example, may be indicative of unsafe driving, but such a count results in only a vague sense of the driver's patterns. On the other hand, a context-sensitive report that indicates the driver repeatedly applies the brake during turns would be far more revealing of a potentially-dangerous driving pattern. Unfortunately, however, the analysis performed by Kondo, which is typical of the prior art analysis techniques, is incapable of providing such context-sensitive information. (See "Limitations of the Prior Art" below.)

U.S. Pat. No. 6,060,989 to Gehlot (herein denoted as "Gehlot") describes a system of sensors within a vehicle for determining physical impairments that would interfere with a driver's ability to safely control a vehicle. Specific physical impairments illustrated include intoxication, fatigue and drowsiness, or medicinal side-effects. In Gehlot's system, sensors monitor the person of the driver directly, rather than the vehicle. Although this is a useful approach in the case of physical impairments (such as those listed above), Gehlot's system is ineffective in the case of a driver who is simply unskilled or who is driving recklessly, and is moreover incapable of evaluating a driver's normal driving patterns.

U.S. Pat. No. 6,438,472 to Tano, et al. (herein denoted as "Tano") describes a system which analyzes raw driving data (such as speed and acceleration data) in a statistical fashion to obtain statistical aggregates that can be used to evaluate driver performance. Unsatisfactory driver behavior is determined when certain predefined threshold values are exceeded. A driver whose behavior exceeds a statistical threshold from what is considered "safe" driving, can be deemed a "dangerous" driver. Thresholds can be applied to various statistical measures, such as standard deviation. Because Tano relies on statistical aggregates and thresholds which are acknowledged to vary according to road location and characteristics, however, a system according to Tano has limited ability to evaluate driver performance independent of the statistical profiles and thresholds. In particular, the statistical characterization of a driver's performance is generally not expressible in terms of familiar driving patterns. For example, a driver may have a statistical profile that exceeds a particular lateral acceleration threshold, and the driver may therefore be classified as a "dangerous" driver. But what driving pattern is responsible for excessive lateral acceleration? Is it because this driver tends to take curves too fast? Or is it because he tends to change lanes rapidly while weaving in and out of traffic? Both are possibly "dangerous" patterns, but a purely threshold-oriented statistical analysis, such as presented in Tano, may be incapable of discriminating between these, and therefore cannot attribute the resulting statistical profile to specific patterns of driving. As noted for Kondo's analysis (above), Tano's statistical analysis is also incapable of providing information in terms of familiar driving patterns.

In addition to the above issued patents, there are several commercial products currently available for monitoring vehicle driving behavior. The "Mastertrak" system by Vetronix Corporation of Santa Barbara, Calif. is intended as a fleet management system which provides an optional "safety module". This feature, however, addresses only vehicle speed and safety belt use, and is not capable of analyzing driver behavior patterns. The system manufactured by SmartDriver of Houston, Tex. monitors vehicle speed, accelerator throttle position, engine RPM, and can detect, count, and report on the exceeding of thresholds for these variables. Unfortunately, however, there are various driving patterns which cannot be classified on the basis of thresholds, and which are nevertheless pertinent to detecting questionable or unsafe driving behavior. For example, it is generally acknowledged that driving too slowly on certain roads can be hazardous, and for this reason there are often minimum speed limits. Driving below a minimum speed, however, is not readily detectable by a system such as SmartDriver, because introducing a low-speed threshold results in such a large number of false reports (when the vehicle is driven slowly in an appropriate location) that collecting such data is not normally meaningful.

Limitations of the Prior Art

Collecting raw physical data on vehicle operation through a multiplicity of sensors usually results in a very large quantity of data which is cumbersome to store and handle, and impractical to analyze and evaluate. For this reason, any automated system or method of driver behavior analysis and evaluation must employ some abstraction mechanism to reduce the data to a manageable size and in a meaningful way.

For the prior art, as exemplified by the specific instances cited above, this is done through statistical processing and the use of predetermined thresholds, supplemented in some cases by limited continuous pre-processing (e.g., time-differentiation), optionally correlated in some cases with available history or other data on the location where the driving is being done. As a result, prior art systems and methods are generally limited to providing aggregate and statistically-processed overviews of driver performance. This is expressed succinctly in Lemelson 111: "The computer analysis may determine the manner in which the vehicle is driven, either during a specific time interval or a number of time intervals or over a longer period of time wherein averaging is employed to determine the general performance or use of the vehicle"(column 1 lines 21-26). That is, prior art analysis and evaluation is based on overall performance during a particular driving session, or is based on statistical averages over a number of different sessions. In limited cases, the analysis and evaluation can be made with regard to a particular road or road segment, through the application of GPS locating.

FIG. 1 illustrates the general prior art analysis and evaluation approach. A typical set of sensors 101 has a tachometer 103, a speedometer 105, one or more accelerometers 107, a GPS receiver 109, and optional additional sensors 111. In the case of accelerometers, it is understood that an accelerometer is typically operative to monitoring the acceleration along one particular specified vehicle axis, and outputs a raw data stream corresponding to the vehicle's acceleration along that axis. Typically, the two main axes of vehicle acceleration that are of interest are the longitudinal vehicle axis—the axis substantially in the direction of the vehicle's principal motion ("forward" and "reverse"); and the transverse (lateral) vehicle axis—the substantially horizontal axis substantially orthogonal to the vehicle's principal motion ("side-to-side"). An accelerometer which is capable of monitoring multiple independent vector accelerations along more than a single axis (a "multi-axis" accelerometer) is herein considered as, and is denoted as, a plurality of accelerometers, wherein each accelerometer of the plurality is capable of monitoring the acceleration along only a single axis. Additional sensors can include sensors for driver braking pressure, accelerator pressure, steering wheel control, handbrake, turn signals, and transmission or gearbox control, clutch (if any), and the like. Some of the sensors, such as tachometer 103 and speedometer 105 may simply have an analog signal output which represents the magnitude of the quantity. Other sensors, such as a transmission or gearbox control sensor may have a digital output which indicates which gear has been selected. More complex output would come from GPS receiver 109, according to the formatting standards of the manufacturer or industry. Other sensors can include a real-time clock, a directional device such as a compass, one or more inclinometers, temperature sensors, precipitation sensors, available light sensors, and so forth, to gauge actual road conditions and other driving factors. Digital sensor output is also possible, where supported. The output of sensor set 101 is a stream of raw data, in analog and/or digital form.

Sensor outputs are input into an analysis and evaluation unit 113, which has threshold settings 115 and a threshold discriminator 117. A statistical unit 119 provides report summaries, and an optional continuous processing unit 121 may be included to preprocess the raw data. The output of analysis and evaluation unit 113 is statistically-processed data.

A report/notification/alarm 123 is output with the results of the statistical analysis, and may contain analysis and evaluations of one or more of the following: an emergency alert 125, a driving session 1 statistics report 127, a driving session 2 statistics report 129, etc., and a driving session n statistics report 131, a driving session average statistics report 133, and a road-specific driving session statistics report 135.

These reports may be useful in analyzing and evaluating driver behavior, skill, and attitude, but the use of statistics based predominantly on thresholds or on localization of the driving, and the aggregation over entire driving sessions or groups of driving sessions also result in the loss of much meaningful information.

In particular, the details of the driver's behavior in specific driving situations are not available. Familiar driving situations, such as passing, lane changing, traffic blending, making turns, handling intersections, handling off- and on-ramps, driving in heavy stop- and-go traffic, and so forth, introduce important driving considerations. It is evident that the aggregate statistics for a given driver in a given driving session depend critically on the distribution and mix of these situations during that given session.

For example, the same driver, driving in a consistent manner but handling different driving situations may exhibit completely different driving statistics. One of the key benefits of monitoring driving behavior is the ability to determine a driver's consistency, because this is an important indicator of that driver's predictability, and therefore of the safety of that driver's performance. If the driver begins to deviate significantly from an established driving profile, this can be a valuable advance warning of an unsafe condition. Perhaps the driver is fatigued, distracted, or upset, and thereby poses a hazard which consistency analysis can detect. It is also possible that the driver has been misidentified and is not the person thought to be driving the vehicle. Unfortunately, however, statistically aggregating data, as is done in the prior art, does not permit a meaningful consistency analysis, because such an analysis depends on the particular driving situations which are encountered, and prior art analysis completely ignores the specifics of those driving situations.

A typical prior art report presents information such as: the number of times a set speed limit was exceeded; the maximum speed; the number of times a set RPM limit was exceeded; the maximum lateral acceleration or braking deceleration; and so forth. Such information may be characteristic of the driver's habits, but it would be much better to have a report that is based on familiar driving situations, maneuvers, and patterns—for example, by revealing that the driver has a habit of accelerating during turns, or makes frequent and rapid high-speed lane changes.

As another example of the limitations of the prior art, a new and relatively inexperienced driver might drive very cautiously and thereby have very "safe" overall statistics, but might lack skills for handling certain common but more challenging driving situations. An experienced driver, however, might exhibit what appear to be more "dangerous" overall statistics, but might be able to handle those challenging driving situations much better and more safely than the new driver. Prior art analysis systems and methods, however, might erroneously deduce that the more experienced driver poses the greater hazard, whereas in reality it is the apparently "safer" driver who should be scrutinized more carefully.

There is thus a need for, and it would be highly advantageous to have, a method and system for analyzing a raw vehicle data stream to determine the corresponding sequence of behavior and characteristics of the vehicle's driver in the context of familiar driving situations, and for expressing driving behavior and characteristics in terms of familiar driving patterns and maneuvers. This goal is met by the present invention.

SUMMARY OF THE INVENTION

The present invention is of a system and method for analyzing and evaluating a raw data stream related to the operation of a vehicle for the purpose of classifying and rating the performance of the vehicle's driver. Unlike prior art systems and methods, embodiments of the present invention are not restricted to performing statistical and threshold analysis and evaluation of the driver's skills and behavior, but can express an analysis and evaluation in terms of familiar driving patterns and maneuvers, thereby yielding analyses and evaluations which contain more information and which are more readily put to use.

According to embodiments of the present invention, the raw data stream from the vehicle sensors is progressively analyzed to obtain descriptors of the driving operations which are less and less "data" and more and more expressive of familiar driving operations and situations. An objective of the present invention is to identify the context in which each event takes place. For example, braking suddenly is defined as an event, and the context of such an event may be the making of a turn which was entered at too high a speed.

It is thus an objective of the present invention to identify events in the context of driving situations. Whereas prior art solutions perform statistical analysis according to threshold levels of measurable variables (such as counting the number of times a driver exceeds a particular speed), it is a goal of the present invention to recognize common patterns of driving situations (such as lane changing) and to associate other events with a context (such as increasing speed during a lane change) which may represent unsafe driving behavior.

It is an objective of the present invention to facilitate the classification of a driver's skill on the basis of sensor measurements of the driven vehicle. It is also an objective of the present invention to facilitate the classification of a driver's attitude on the basis of sensor measurements of the driven vehicle, where the term "attitude" herein denotes the driver's approach toward driving and the tendency of the driver to take risks. Categories include, but are not limited to: "safe" (or "normal"); "aggressive" (or "risky"); "thrill-seeking"; "abusive"; and "dangerous". In an embodiment of the present invention, aggressive or dangerous behavior is logged as an event.

It is moreover an objective of the present invention to enable the making of quantitative and qualitative comparisons between a current driver's behavior and a previous profile of the same driver, independent of the particular details of the driving sessions involved, by qualifying and quantifying the driver's behavior when performing common driving maneuvers in common driving situations.

Therefore, according to the present invention there is provided a system for analyzing and evaluating the performance and behavior of the driver of a vehicle, the system including: (a) a vehicle sensor operative to monitor the state of the vehicle and to output a raw data stream corresponding thereto; (b) a driving event handler operative to detect driving events based on the raw data stream and to output a driving event string corresponding thereto, the driving event string containing at least one driving event symbol corresponding to a driving event; and (c) a maneuver detector operative to recognize patterns of driving maneuvers and to construct and output a driving maneuver sequence corresponding thereto, the driving maneuver sequence containing at least one driving maneuver.

In addition, according to the present invention there is also provided a method for analyzing and evaluating the performance and behavior of the driver of a vehicle, based on a raw data stream from a set of sensors operative to monitor the state of the vehicle, the method including: (a) detecting driving events represented by the raw data stream, and generating a driving event string therefrom; and (b) matching patterns in the driving event string to detect driving maneuvers therein, and generating a driving maneuver sequence therefrom.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a system and method according to the present invention may be understood with reference to the drawings and the accompanying description.

System and Data Progression

Figure 1:
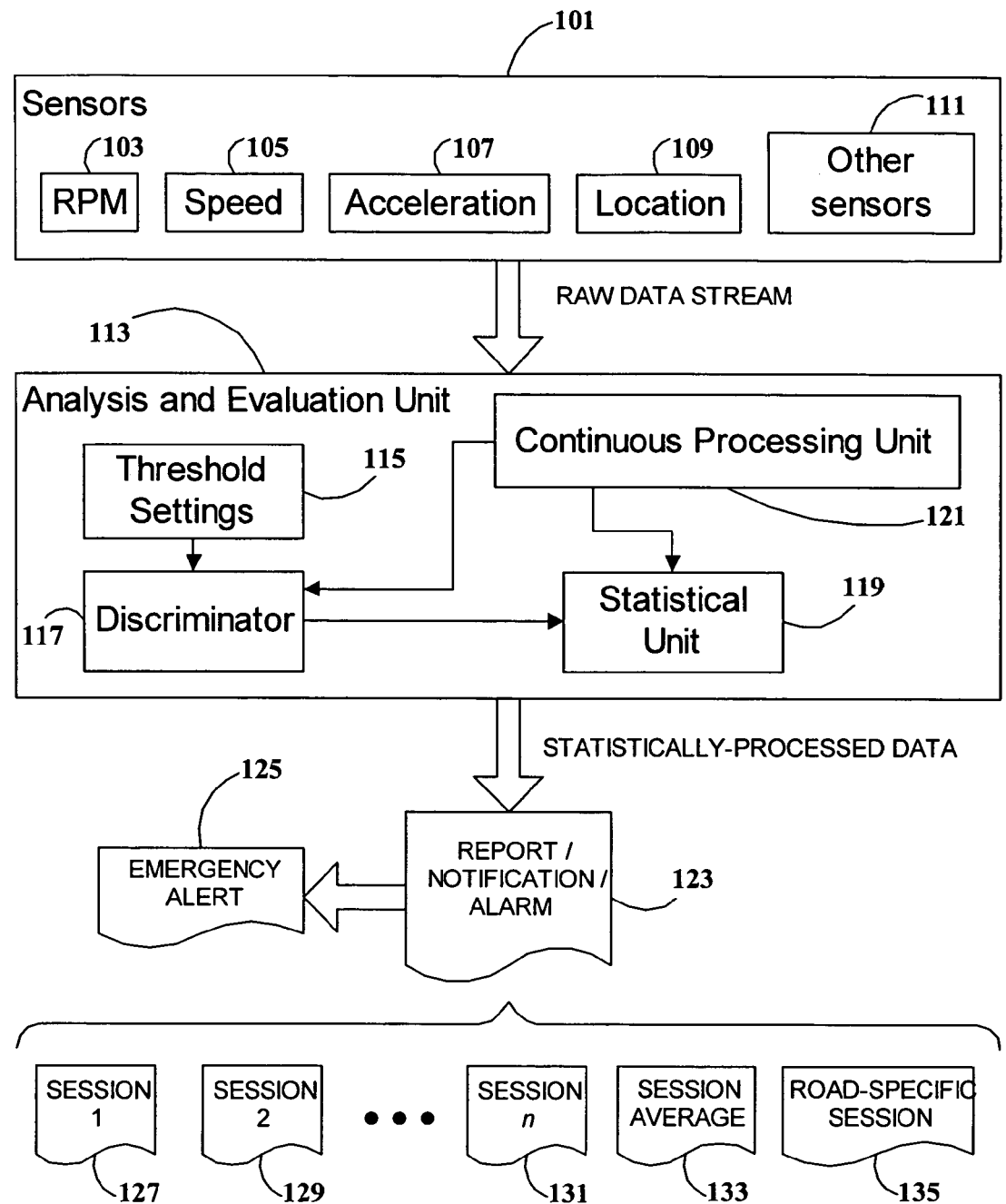
FIG. 1 conceptually illustrates prior art analysis and evaluation of vehicle driving data.
Figure 2:
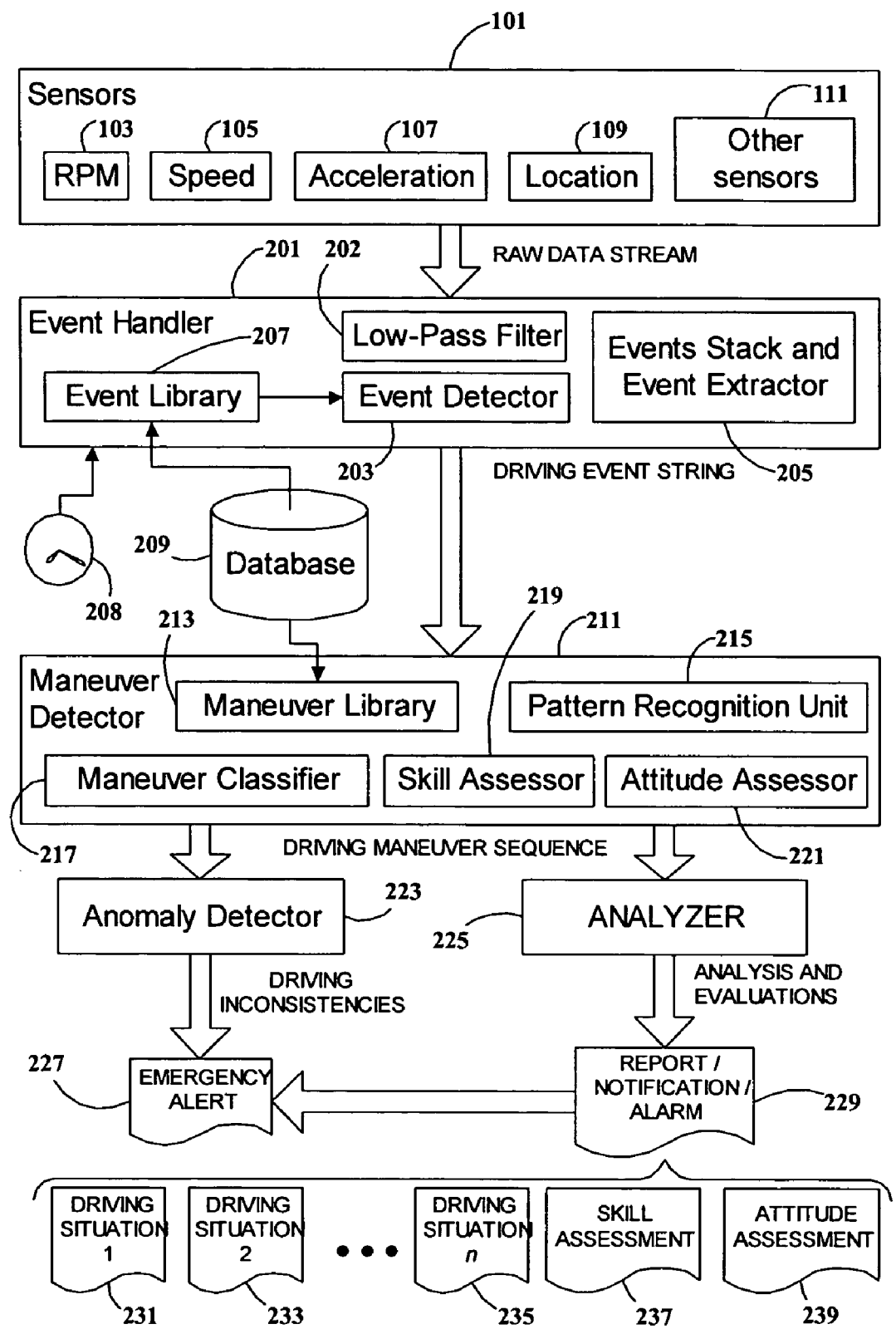
FIG. 2 is a block diagram of a system according to an embodiment of the present invention.

FIG. 2 illustrates a system according to an embodiment of the present invention. Sensor set 101 is comparable to that of the prior art system illustrated in FIG. 1, for monitoring states of the vehicle, and having an output in the form of a raw data stream. The raw data is input into a driving event handler 201, which contains a low-pass filter 202, a driving event detector 203, a driving events stack and driving event extractor 205 for storing and managing the driving events, and a driving event library 207, which obtains specific data from a database 209.

According to the present invention, driving events are "primitive" driving operations that characterize basic moves of driving, as explained and illustrated in detail below. Driving event handler 201 performs a basic analysis on the raw data from sensor set 101, and outputs a string of driving events corresponding to the raw data stream. A driving event string is represented as a time-ordered non-empty set of driving event symbols arranged in order of their respective occurrences. Driving event detector 203 performs a best-fit comparison of the filtered sensor data stream with event types from event library 207, such as by using the well-known sliding window technique over the data stream. A real-time clock 208 provides a reference time input to the system, illustrated here for a non-limiting embodiment of the present invention as input to driving event handler 201.

Furthermore, according to embodiments of the present invention, a driving event is characterized by a symbol that qualitatively identifies the basic driving operation, and may be associated with one or more numerical parameters which quantify the driving event. These parameters may be derived from scaling and offset factors used in making the best-fit comparison against events from event library 207, as described above. For example, the scaling of the time axis and the scaling of the variable value axis which produce the best fit of the selected segment of the input data stream to the model of the event in event library 207 can be used as numerical parameters (in most cases, one or more of these numerical parameters are related to the beginning and end times of the driving event). If close fits can be obtained between the string of driving events and the input data stream, the event string (including the event symbols and associated parameter set) can replace the original data stream, thereby greatly compressing the data and providing an intelligent analysis thereof.

As a non-limiting example, a simple event is to start the vehicle moving forward from a stopped position (the "start" event). A numerical parameter for this event is the magnitude of the acceleration. A generalized version of this event is to increase the speed of a moving vehicle (the "accelerate" event). Another simple event is to slow the vehicle to a halt from a moving condition (the "stop" event). Other events are of like simplicity. In place of a continuous stream of data from the sensors, which is the input to event handler 201, the output driving event string is a sequence of basic driving events as explained above.

The driving event string is then input into a driving maneuver detector 211. According to the present invention, a driving maneuver is a combination of driving events which are encountered as a familiar pattern in normal driving. A "lane change", for example, is a driving maneuver that, in the simplest case, may be represented by a combination of a lateral acceleration followed by a lateral deceleration during a period of forward motion. A lane change during a turn is more involved, but can be similarly represented by a combination of driving events. As in the case of the driving events themselves, driving maneuvers can contain one or more numerical parameters, which are related to the numerical parameters of the driving events which make up the driving maneuver.

A driving maneuver sequence is a time-ordered non-empty set of driving maneuvers arranged according to the respective times of their occurrence. Returning to FIG. 2, it is seen that in order to derive driving a sequence of driving maneuvers from a string of driving events, maneuver detector 211 contains a maneuver library 213 fed from database 209, a pattern recognition unit 215 to recognize patterns of driving maneuvers to identify clusters of driving events which make up driving maneuvers, and a maneuver classifier 217 to construct a reasonable driving maneuver sequence output corresponding to the input driving event string. Exemplary non-limiting patterns include sequences of events such as accelerating out of stops and changing lanes while speeding or approaching turns too fast. By comparing the timing and other quantities of the driving maneuver with those of known skillful drivers, a skill assessor 219 can develop and assign a skill rating for the current driver's handling of the driving maneuver. Furthermore, by analyzing the magnitude of certain key parameters (such as those related to acceleration and deceleration during the maneuver), an attitude assessor 221 can develop and assign an attitude rating to the current driver's execution of the driving maneuver. Moreover, each maneuver is assigned a weighting driving risk coefficient for developing and assigning an aggregate attitude rating for the current driver.

The following Table 1 includes non-limiting examples of some common driving maneuvers, their common meaning in a driving context, and their suggested driving risk coefficients. In a non-limiting example, coefficients range from 1 to 10, with 10 representing the most dangerous driving maneuvers. Risk coefficients, of course, are subjective, and according to an embodiment of the present invention may be redefined to suit empirical evidence.

TABLE 1

Examples of Driving Maneuvers and Driving Risk Coefficients

| Driving Maneuver | Coefficient |
| --- | --- |
| Accelerate | 3 |
| increase vehicle speed | |
| Accelerate before Turn | 6 |
| increase vehicle speed prior to a turn | |
| Accelerate during Lane Change | 5 |
| increase vehicle speed while moving to a different travel lane | |
| Accelerate into Turn | 5 |
| Increase vehicle speed while initiating a turn | |
| Accelerate into Turn out of Stop | 6 |
| start moving vehicle while initiating a turn from a stopped position | |
| Accelerate out of Stop | 5 |
| start moving vehicle from a stopped position | |
| Accelerate out of Turn | 4 |
| increase vehicle speed while completing a turn | |
| Accelerate while Passing | 5 |
| increase vehicle speed while overtaking and bypassing a leading vehicle when initially traveling in the same travel lane | |
| Braking | 5 |
| applying vehicle brakes to reduce speed | |
| Braking after Turn | 6 |
| applying vehicle brakes to reduce speed after completing a turn | |
| Braking before Turn | 7 |
| applying vehicle brakes to reduce speed before beginning a turn | |

TABLE 1-continued

Examples of Driving Maneuvers and Driving Risk Coefficients

| Driving Maneuver | Coefficient |
| --- | --- |
| Braking into Stop | 3 |
| applying vehicle brakes to reduce speed and coming to a stopped position | |
| Braking out of Turn | 7 |
| applying vehicle brakes to reduce speed while completing a turn | |
| Braking within Turn | 8 |
| applying vehicle brakes to reduce speed during a turn | |
| Failed Lane Change | 10 |
| aborting an attempted move to a different travel lane | |
| Failed Passing | 10 |
| aborting an attempt to overtake and bypass a leading vehicle when initially traveling in the same travel lane | |
| Lane Change | 4 |
| moving into a different travel lane | |
| Lane Change and Braking | 8 |
| moving into a different travel lane and then applying vehicle brakes to reduce speed | |
| Passing | 4 |
| overtaking and bypassing a leading vehicle when initially traveling in the same travel lane | |
| Passing and Braking | 8 |
| overtaking and passing a leading vehicle when initially traveling in the same travel lane and then applying vehicle brakes to reduce speed | |
| Turn | 3 |
| substantially changing the vehicle travel direction | |
| Turn and Accelerate | 4 |
| substantially changing the vehicle travel direction and then increasing vehicle speed | |
| U-Turn | 5 |
| substantially reversing the vehicle travel direction | |

Following processing by driving maneuver detector 211, a driving anomaly detector 223 checks the output driving maneuvers for inconsistencies in the driving profile of the driver. A profile or set of profiles for a driver can be maintained in database 209 for comparison with the driver's current behavior. A set of profiles for various maneuvers can be maintained so that whatever the current driving maneuver happens to be, a comparison can be made with a similar recorded maneuver. If there is a substantial discrepancy between the current driving maneuvers and stored profiles for the driver which are used as reference, the driving inconsistencies can be reported to an emergency alert 227 for follow-up checking or investigation. As previously noted, a significant discrepancy or inconsistency may indicate an unsafe condition.

The sequence of driving maneuvers that is output by driving maneuver detector 211 also goes to an analyzer 225, which outputs analysis and evaluation of the driving behavior to a report/notification/alarm 229. As is illustrated in FIG. 2, report/notification/alarm 229 can contain information on a driving situation 1 analysis report 231, a driving situation 2 analysis report 233, etc., and a driving situation n analysis report 235. In addition, by statistically-processing the driving situation analysis reports, it is possible to produce some overall analyses and evaluations, such as a driving skill assessment report 237 and a driving attitude assessment report 239.

Analysis of Raw Data to Obtain a Driving Event String

Figure 3:
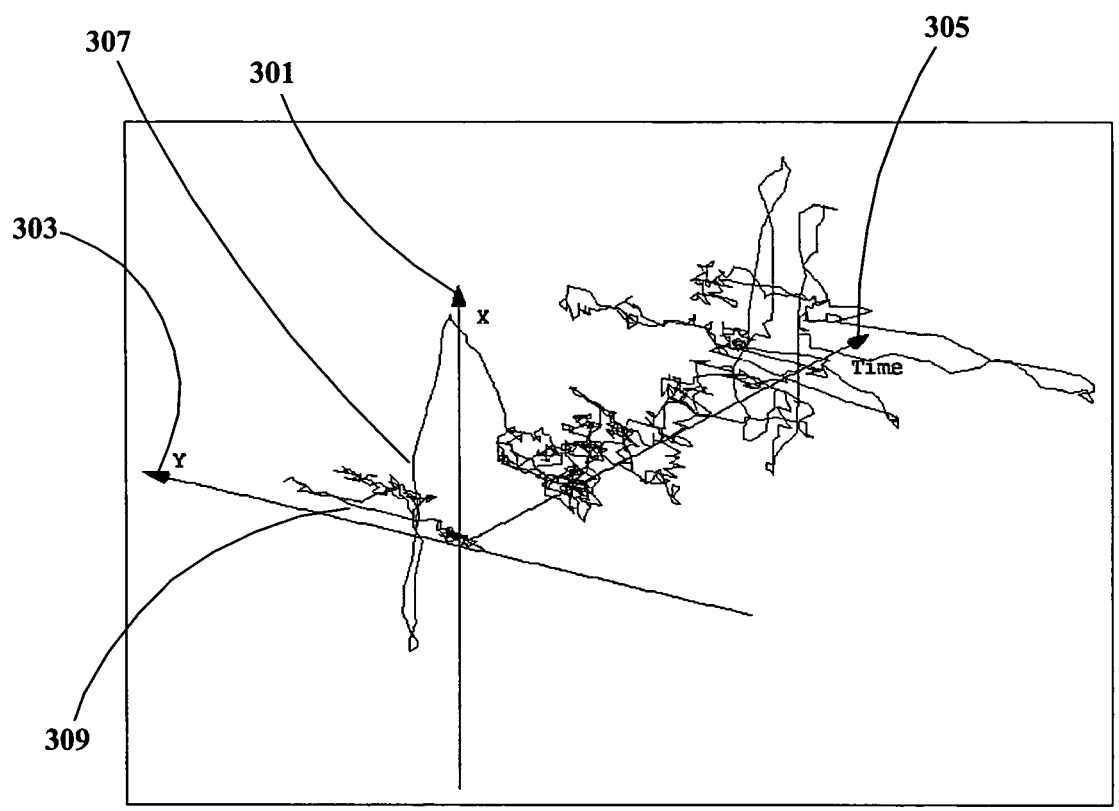
FIG. 3 is an example of a graph of a raw data stream from multiple vehicle accelerometers.

FIG. 3 illustrates an example of raw data from multiple vehicle accelerometers, as plotted in a 3-dimensional form. An x-axis 301 represents the longitudinal acceleration of the vehicle (in the direction in which the vehicle is normally traveling), and hence "forward" and "reverse" acceleration and deceleration data 307 is plotted along the x-axis. A y-axis 303 represents the transverse (lateral) acceleration of the vehicle to the left and right of the direction in which the vehicle is normally traveling, and hence "side-to-side" acceleration data 309 is plotted along the y-axis. A time axis 305 is orthogonal to the x and y-axes.

Data 307 and data 309 are representative of the time-dependent raw data stream output from sensor set 101 (FIG. 2).

Note that FIG. 3 is a non-limiting example for the purpose of illustration. Other raw sensor data streams besides acceleration can be represented in a similar manner. In other cases, however, the graph may not need multiple data axes. Acceleration is a vector quantity and therefore has directional components, requiring multiple data axes. Scalar variables, however, have no directional components and 2-dimensional graphs suffice to represent the data stream in time. Speed, brake pressure, and so forth are scalar variables.

Figure 4:
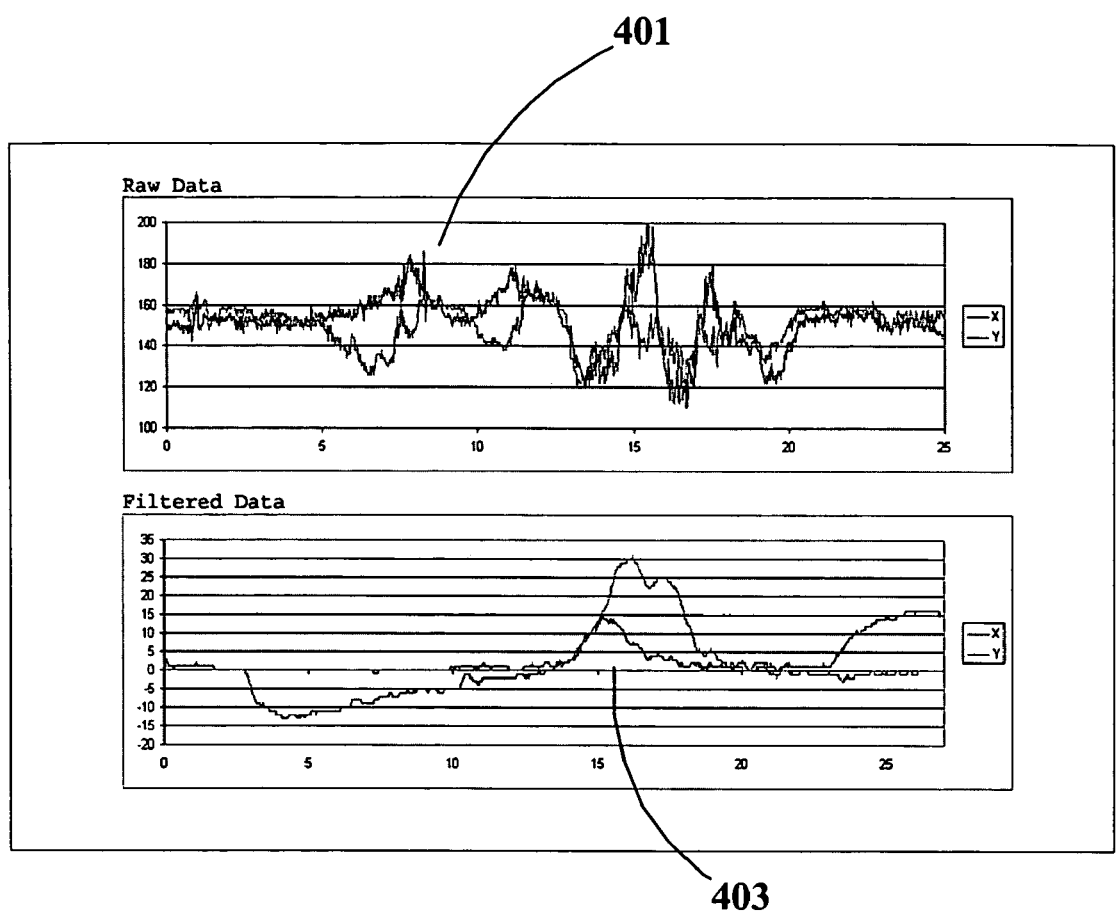
FIG. 4 is an example of the filtering of the raw data stream to remove noise, according to the present invention.

FIG. 4 illustrates the effect of the initial filtering of the raw data stream performed by low-pass filter 202. FIG. 4 also depicts acceleration data in two dimensions, but these are collapsed onto the same axis. A raw data stream 401 is representative of the time-dependent output from sensor set 101 (FIG. 2). After applying low-pass filter 202, a filtered data stream 403 is output. In addition to low-pass filtering, low-pass filter 202 can also apply a moving average and/or a domain filter. Filtered data stream 403 is thus a data stream with the unwanted noise removed.

Figure 5:
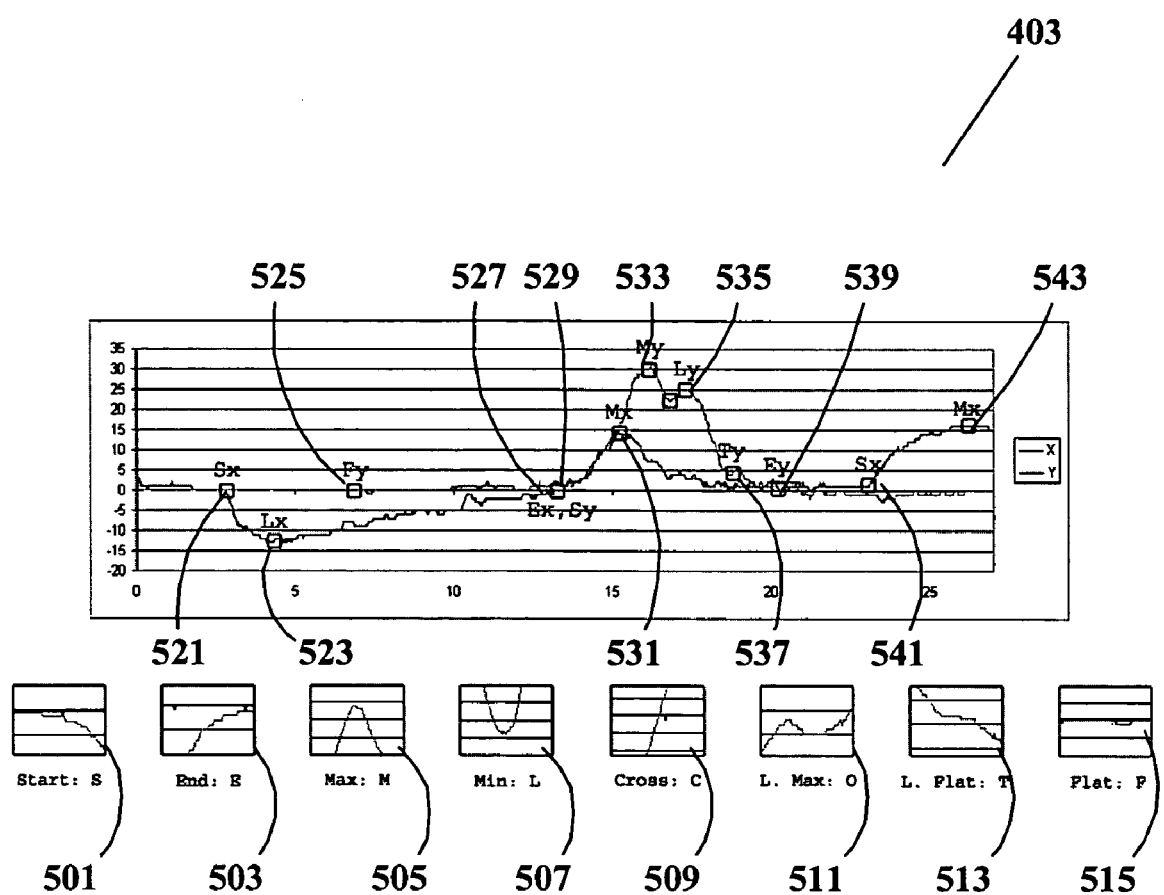
FIG. 5 is an example of parsing a filtered data stream to derive a string of driving events, according to the present invention.

FIG. 5 illustrates the parsing of filtered data stream 403 to derive a string of driving events. Driving events are indicated by distinctive patterns in the filtered data stream, and can be classified according to the following non-limiting set of driving events:
- a "Start" event 501, designated herein as S, wherein the variable has an initial substantially zero value;
- an "End" event 503, designated herein as E, wherein the variable has a final substantially zero value;
- a maximum or "Max" event 505, designated herein as M, wherein the variable reaches a substantially maximum value;
- a minimum or "Min" event 507, designated herein as L, wherein the variable reaches a substantially minimum value;
- a "Cross" event 509, designated herein as C, wherein the variable changes sign (crosses the zero value on the axis);
- a local maximum or "L. Max" event 511, designated herein as O, wherein the variable reaches a local substantially maximum value;
- a local flat or "L. Flat" event 513, designated herein as T, wherein the variable has a local (temporary) substantially constant value; and
- a "Flat" event 515, designated herein as F, wherein the variable has a substantially constant value.

As previously mentioned, each of these driving events designated by a symbolic representation also has a set of parameters which quantify the numerical values associated with the event. For example, a "Max" event M has the value of the maximum as a parameter. In addition, the time of occurrence of the event is also stored with the event.

It is possible to define additional driving events in a similar fashion. In cases where there are vector quantities involved, such as for acceleration (as in the present non-limiting example), the driving event designations are expanded to indicate whether the event relates to the x component or the y component. For example, a maximum of the x-component (of the acceleration) is designated as Mx, whereas a maximum of the y-component (of the acceleration) is designated as My.

It is noted that there are many possible descriptive terms for the driving events and driving maneuvers described herein, and it is therefore understood that the particular descriptive terms are non-limiting, and that other descriptions are also applicable. As an illustrative example, the Passing driving maneuver is herein named after the common term for the maneuver in the United States, but is customarily referred to as "bypassing" in some countries and as "overtaking" in other countries. These terms all refer to the same driving maneuver, however. Therefore, it is understood that any term which reasonably describes substantially the same physical occurrence or substantially the same sequence of events as a term used herein is equivalent to the term used herein.

Referring again to FIG. 5, it is seen that filtered data 403 represents the following time-ordered sequence of driving events:
- an Sx event 521;
- an Lx event 523;
- an Fy event 525;
- an Ex event 527;
- an Sy event 529;
- an Mx event 531;
- an My event 533;
- an Ly event 535;
- a Ty event 537;
- an Ey event 539;
- an Sx event 541; and
- an Mx event 543.

The above analysis is performed by event handler 201 (FIG. 2). The resulting parsed filtered data thus results in the output of the driving event string from event handler 201:

Sx Lx Fy Ex Sy Mx My Ly Ty Ey Sx Mx

Once again, each of the symbols of the above event string has associated parameters which numerically quantify the individual events.

According to another embodiment of the present invention, there are also variations on these events, depending on the sign of the variable. For example, there is an Sx positive event and an Sx negative event, corresponding to acceleration and deceleration, respectively.

Analysis of a Driving Event String to Obtain a Sequence of Driving Maneuvers

Many different driving maneuvers can be created from sequences of driving events. A non-limiting sample of driving maneuvers is listed in Table 1 above. With maneuver library 213, which contains the most common driving maneuvers, and with the aid of pattern recognition unit 213 (FIG. 2), it is possible to determine a sequence of driving maneuvers which corresponds to a long string of driving events.

Following are discussions of some non-limiting examples of basic driving maneuvers.

Figure 6:
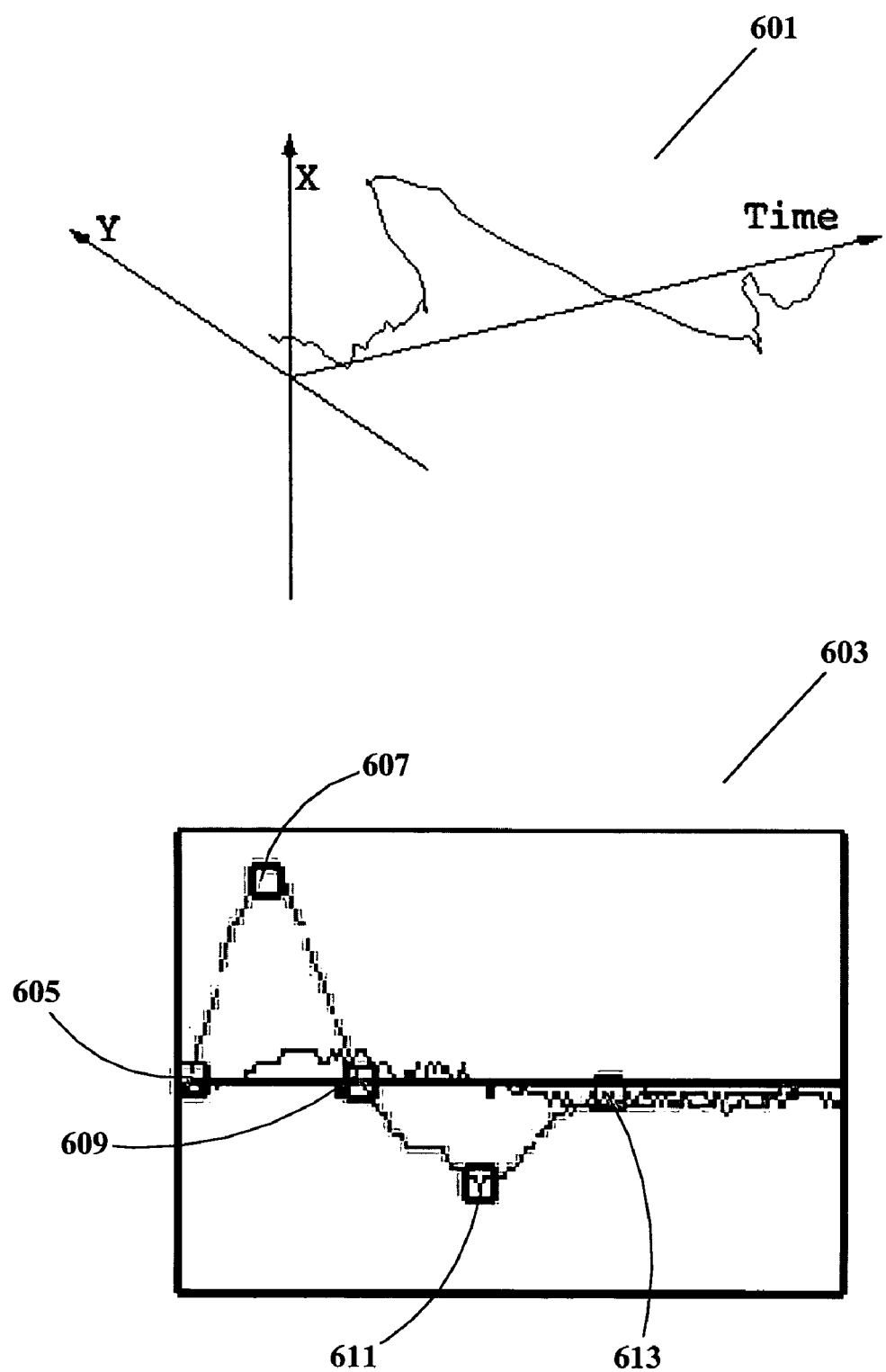
FIG. 6 shows the data and event string analysis for a "lane change" driving maneuver, according to the present invention.

FIG. 6 illustrates raw data 601 for a Lane Change driving maneuver, in terms of a 3-dimensional representation of x- and y-acceleration components. A graph 603 shows the x- and y-acceleration component representations superimposed on a 2-dimensional plot. The driving events indicated are: an Sy event 605; an My event 607; a Cy event 609; an Ly event 611; and an Ey event 613. Thus, the driving event sequence Sy My Cy Ly Ey corresponds to a Lane Change driving maneuver.

Figure 7:
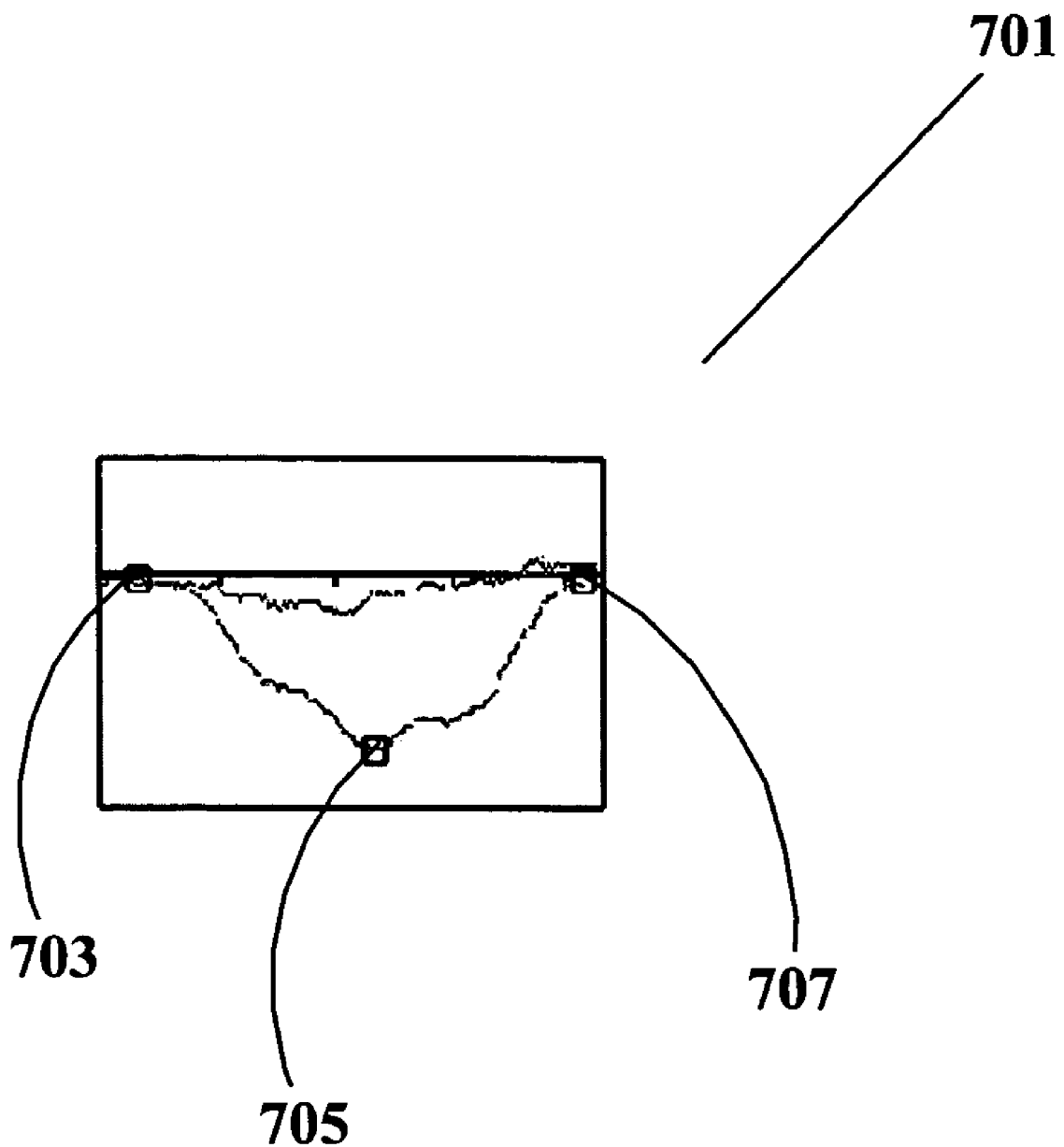
FIG. 7 shows the data and event string analysis for a "turn" driving maneuver, according to the present invention.

FIG. 7 illustrates raw data 701 for a Turn driving maneuver, in terms of a 2-dimensional plot. The driving events indicated are: an Sy event 703; an Ly event 705; and an Ey event 707. Thus, the driving event sequence Sy Ly Ey corresponds to a Turn driving maneuver.

Figure 8:
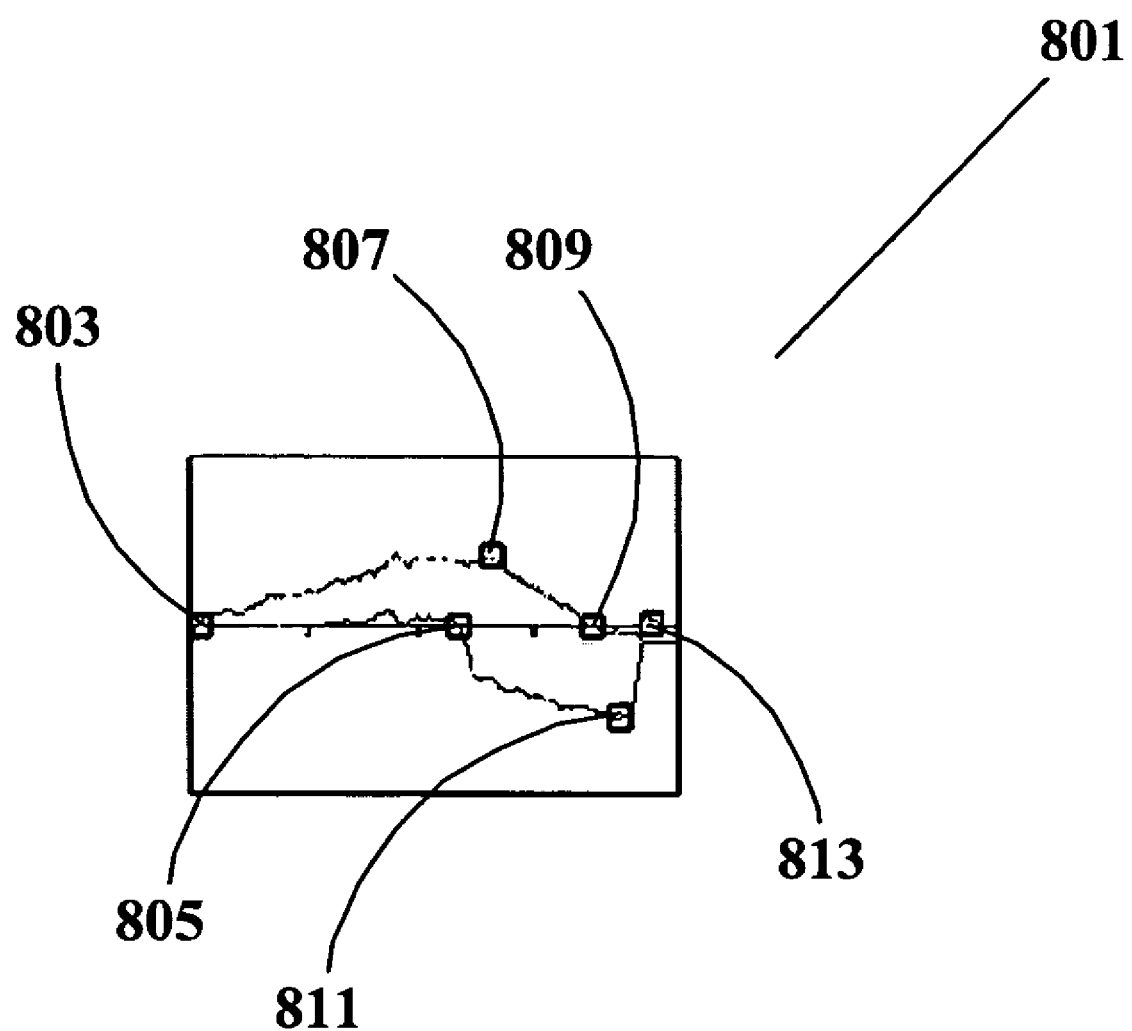
FIG. 8 shows the data and event string analysis for a "braking within turn" driving maneuver, according to the present invention.

FIG. 8 illustrates raw data 801 for a Braking within Turn driving maneuver, in terms of a 2-dimensional plot. The driving events indicated are: an Sy event 803; an Sx event 805; an My event 807; an Ey event 809; an Lx event 811; and an Ex event 813. Thus, the driving event sequence Sy Sx My Ey Lx Ex corresponds to a Braking within Turn driving maneuver.

It is noted that the Braking within Turn driving maneuver illustrates how the relative timing between the x-component events and the y-component events can be altered to create a different driving maneuver. Referring to FIG. 8, it is seen that the order of Sx event 805 and My event 807 can in principle be reversed, because they are events related to different independent variables (the forward x-component of acceleration versus and the lateral y-component of acceleration). The resulting driving event sequence, Sy My Sx Ey Lx Ex thus corresponds to a driving maneuver where the maximum of the lateral acceleration (My) occurs before the braking begins (sx), rather than afterwards as in the original driving maneuver Sy Sx My Ey Lx Ex, as shown in FIG. 8. This minor change in timing can create a related, but different driving maneuver that can, under some circumstances, have significantly different dynamic driving characteristics and may represent a completely different level of risk. Because the timing difference between these two maneuvers can be only a small fraction of a second, the ability of a driver to successfully execute one of these maneuvers in preference over the other may depend critically on the level of driving skill and experience.

Because of such novel analysis features, embodiments of the present invention are able to differentiate between similar, but distinct driving maneuvers, and thereby are able to evaluate driver performance, skill, and behavior in ways that prior art analysis systems and methods cannot achieve through the current statistical and threshold analysis techniques. Prior art statistical and threshold analysis is incapable of considering the effect of such timing nuances on the risks involved in different driving situations.

It is further noted that a similar situation exists regarding the relative timing of Ey event 809 and Lx event 811. These two events are also related to independent variables and in principle can be interchanged to create another different driving event sequence, Sy My Sx Lx Ey Ex. All in all, it is possible to create a total of four distinct, but related event sequences:

1. Sy My Sx Ey Lx Ex
2. Sy Sx My Ey Lx Ex
3. Sy My Sx Lx Ey Ex
4. Sy Sx My Lx Ey Ex

It is noted above that some of these may have radically different characteristics because of these nuances in timing. Alternatively, some of these timing nuances may not produce an appreciable difference in the characteristics of the resulting driving maneuvers. In this latter case, an embodiment of the present invention considers such differences to be variations in a basic driving maneuver, rather than a different driving maneuver. The alternative forms of the driving event strings for these similar driving maneuvers are stored in the database in order that such alternative forms may be easily recognized.

It is further noted that the above remarks are not limited to this particular set of driving maneuvers, but may apply to many other driving maneuvers as well.

Figure 9:
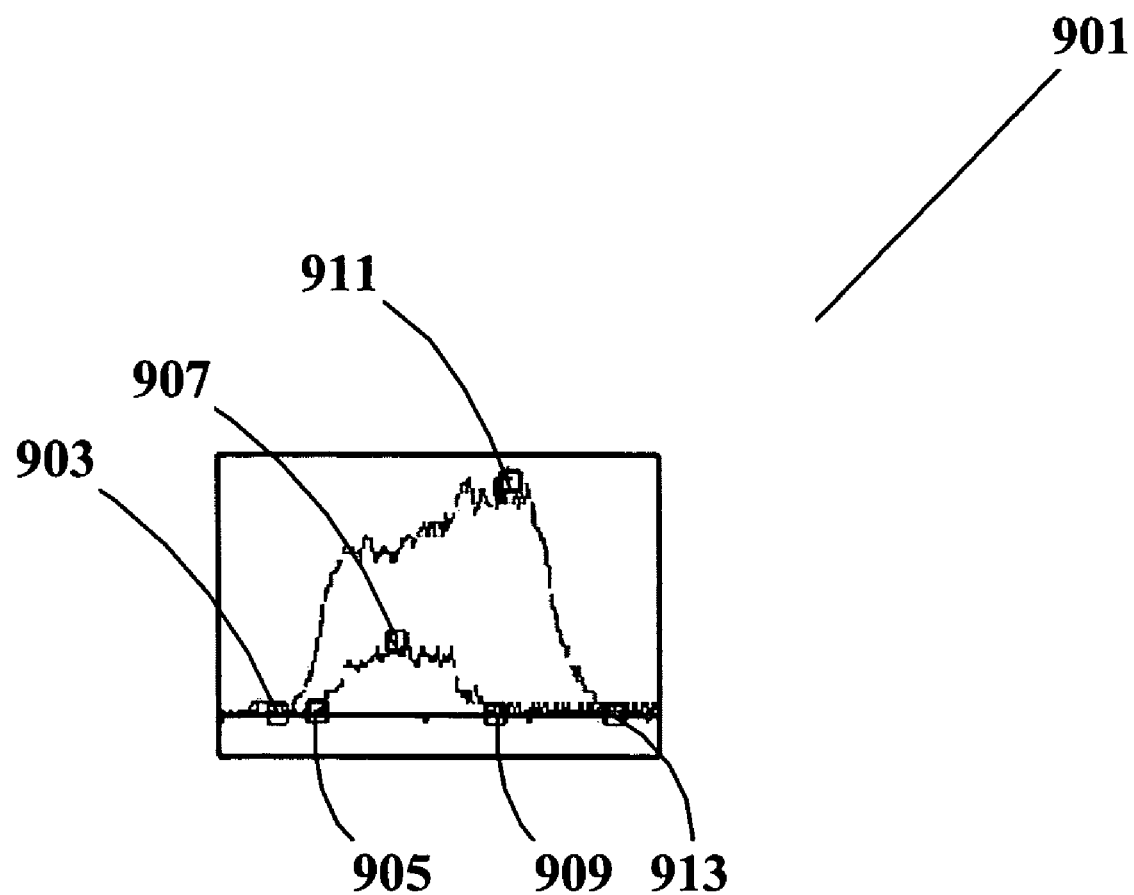
FIG. 9 shows the data and event string analysis for an "accelerate within turn" driving maneuver, according to the present invention.

FIG. 9 illustrates raw data 901 for an Accelerate within Turn driving maneuver, in terms of a 2-dimensional plot. The driving events indicated are: an Sy event 903; an Sx event 905; an Mx event 907; an Ex event 909; an My event 911; and an Ey event 913. Thus, the driving event sequence Sy Sx Mx Ex My Ey corresponds to an Accelerate within Turn driving maneuver.

Figure 10:
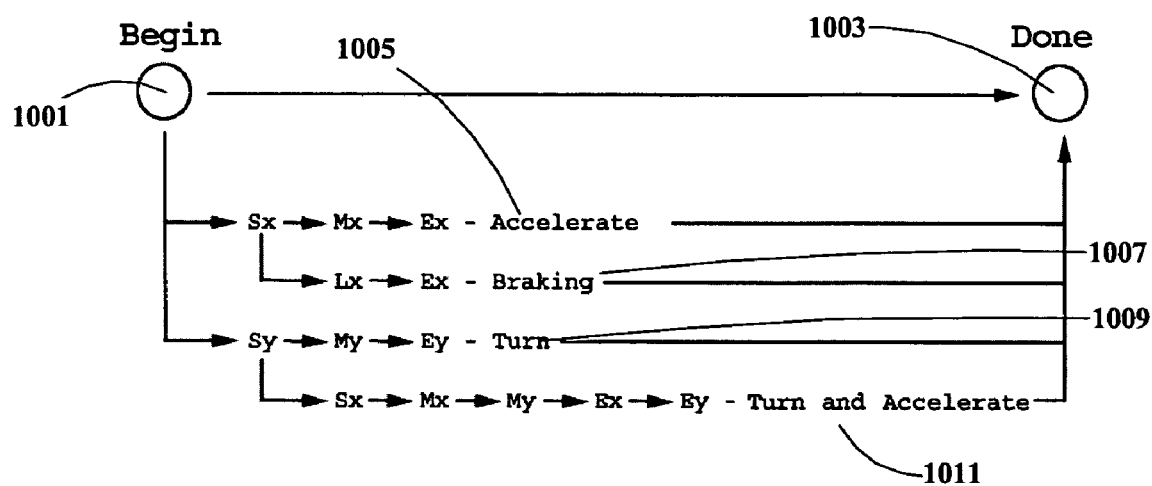
FIG. 10 shows a non-limiting illustrative example of transitions of a finite state machine for identifying driving maneuvers, according to an embodiment of the present invention.

FIG. 10 illustrates a non-limiting example of the transitions of a finite state machine for identifying driving maneuvers, according to an embodiment of the present invention. Such a machine can perform pattern recognition and function as pattern recognition unit 215 (FIG. 2), or can supplement the action thereof. In this example, the machine of FIG. 10 can recognize four different driving maneuvers: Accelerate, Braking, Turn, and Turn and Accelerate. The transitions initiate at a begin point 1001, and conclude at a done point 1003. The machine examines each driving event in the input event string, and traverses a tree with the branchings corresponding to the recognized driving maneuvers as shown. If the first event is Sx, then the maneuver is either Accelerate or Braking. Thus, if the next events are Mx Ex, it is an Accelerate maneuver, and a transition 1005 outputs Accelerate. If the next events are Lx Ex, however, a transition 1007 outputs Braking. Similarly, if the first event is Sy, the maneuver is either Turn or Turn and Accelerate. If the next events are My Ey, a transition 1009 outputs Turn. Otherwise, if the next events are Mx My Ex Ey, a transition 1011 outputs Turn and Accelerate. In this illustrative example, if there is no node corresponding to the next driving event in the event string, the machine makes a transition to done point 1003 without identifying any maneuver. In practice, however, the finite state machine will associate a driving maneuver with each physically-possible input string.

Method and Processing

Figure 11:
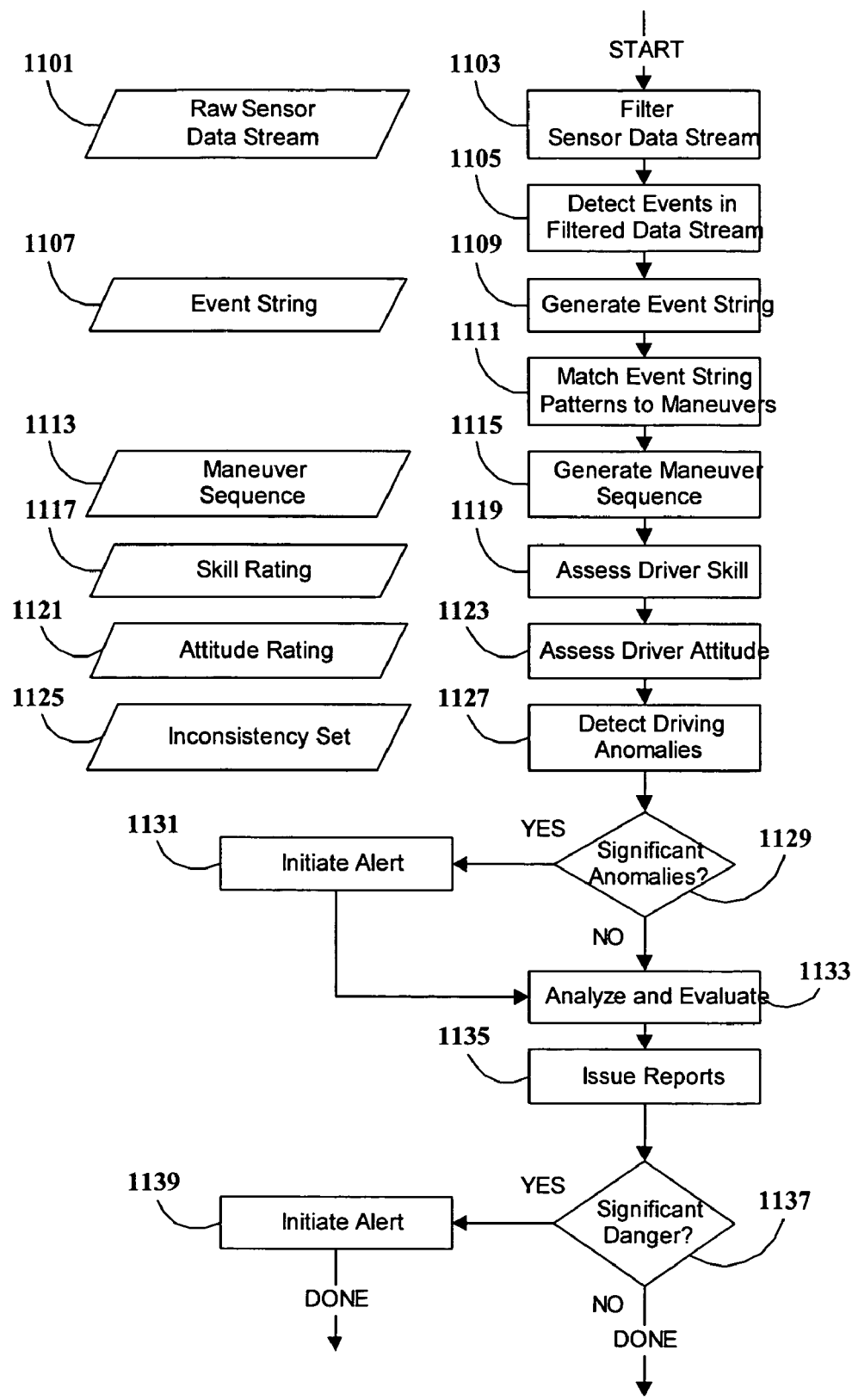
FIG. 11 is a flowchart of a method for analyzing and evaluating vehicle driver performance according to an embodiment of the present invention.

FIG. 11 is an overall flowchart of a method according to the present invention for analyzing and evaluating vehicle driver performance and behavior. The input to the method is a raw sensor data stream 1101, such as the output from sensor set 101 (FIG. 2). The method starts with a filter step 1103 in which the sensor data stream is filtered to remove extraneous noise. This is followed by an event-detection step 1105, after which a driving event string 1107 is generated in a step 1109. After this, a pattern-matching step 1111 matches the events of event string 1107 to maneuvers in maneuver library 213 (FIG. 2), in order to generate a maneuver sequence 1113 in a step 1115. Following this, a step 1119 assesses the driver's skill and creates a skill rating 1117. In addition, a step 1123 assesses the driver's attitude and creates an attitude rating 1121. A step 1127 detects driving anomalies by comparing the current driver behavior with a stored driver profile (if any), and in a decision point 1129 determines if there are any significant anomalies. If there are significant anomalies, a step 1131 initiates an alert to this effect. In any case, a step 1133 analyzes and evaluates the ratings and other findings, including the preparation of statistical summaries as desired. In a step 1135, reports are issued, such as reports 231, 233, 235, 237, and 239 (FIG. 2). If significant indicators of danger have been revealed, such as the case if attitude rating 1121 indicates danger, a step 1139 initiates an appropriate alert.

Assessing Skill and Attitude

Figure 12:
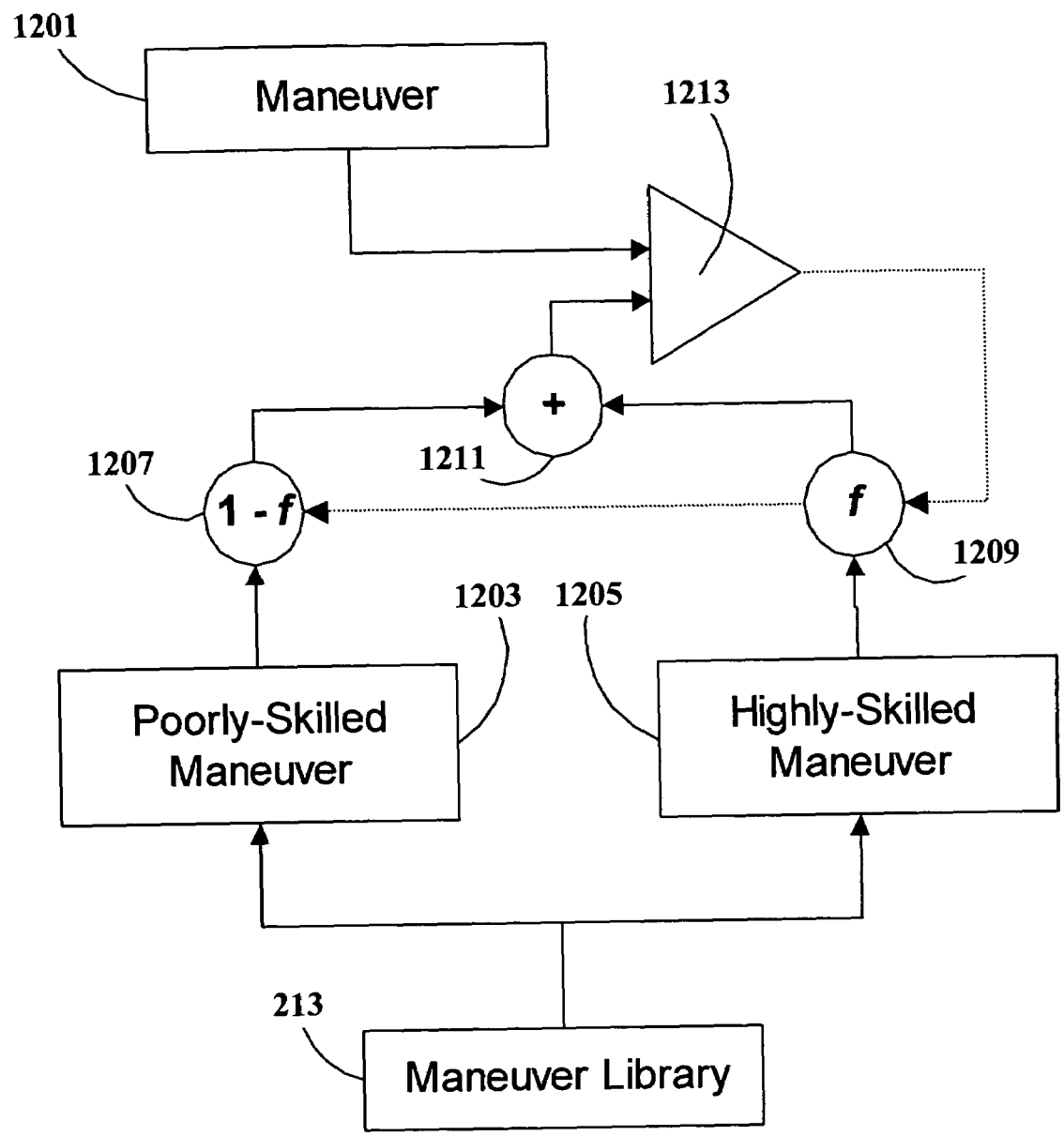
FIG. 12 is a conceptual block diagram of an arrangement for assessing driver skill according to an embodiment of the present invention.

FIG. 12 is a conceptual diagram of an arrangement or process according to an embodiment of the present invention for assessing driver skill for a maneuver 1201. For purposes of this assessment, maneuver 1201 is represented by a driving event sequence, as presented above. Maneuver library 213 (FIG. 2) contains a poorly-skilled maneuver template 1203, which is a driving event sequence for the same maneuver, but with parameters corresponding to those of an inexperienced or poor driver. Maneuver library 213 also contains a highly-skilled maneuver template 1205, which is a driving event sequence for the same maneuver, but with parameters corresponding to those of an experienced and skilled driver. Poorly-skilled maneuver template 1203 and highly-skilled maneuver template 1205 are combined in a weighted fashion by being multiplied by a multiplier 1207 and a multiplier 1209, respectively, with the weighted components added together by an adder 1211. Multiplier 1209 multiplies highly-skilled maneuver template 1205 by a factor f, which ranges from 0 to 1, whereas multiplier 1207 multiplies poorly-skilled maneuver template 1203 by a factor (1−f), so that the output of adder 1211 is a weighted linear combination of poorly-skilled maneuver template 1203 and highly-skilled maneuver template 1205. This weighted linear combination is input into a comparator 1213, which also has an input from maneuver 1201. The output of comparator 1213 adjusts the value of f for both multiplier 1207 and multiplier 1209, such that the stable value of f corresponds to the weighted combination of poorly-skilled maneuver template 1203 and highly-skilled maneuver template 1205 that comes closest to being the same as maneuver 1201. Thus, the factor f serves as a skill ranking of the driver's performance for maneuver 1201, where a value of f=1 represents the highest degree of skill, and a value of f=0 represents the lowest degree of skill. In an embodiment of the present invention, skill ratings corresponding to many driving maneuvers can be statistically-combined, such as by analyzer 225 (FIG. 2).

As noted, FIG. 12 is a conceptual diagram of a process to assess skill level for a maneuver. From the perspective of an algorithm or method, the procedure is simply to find the value of f in the interval [0, 1] for which the f-weighted highly-skilled template added to a (1−f)-weighted poorly-skilled most closely approximates the maneuver in question.

In still another embodiment of the present invention, the assessing of skill by comparison of the maneuver with various standards is accomplished through the application of well-known principles of fuzzy logic.

Figure 13:
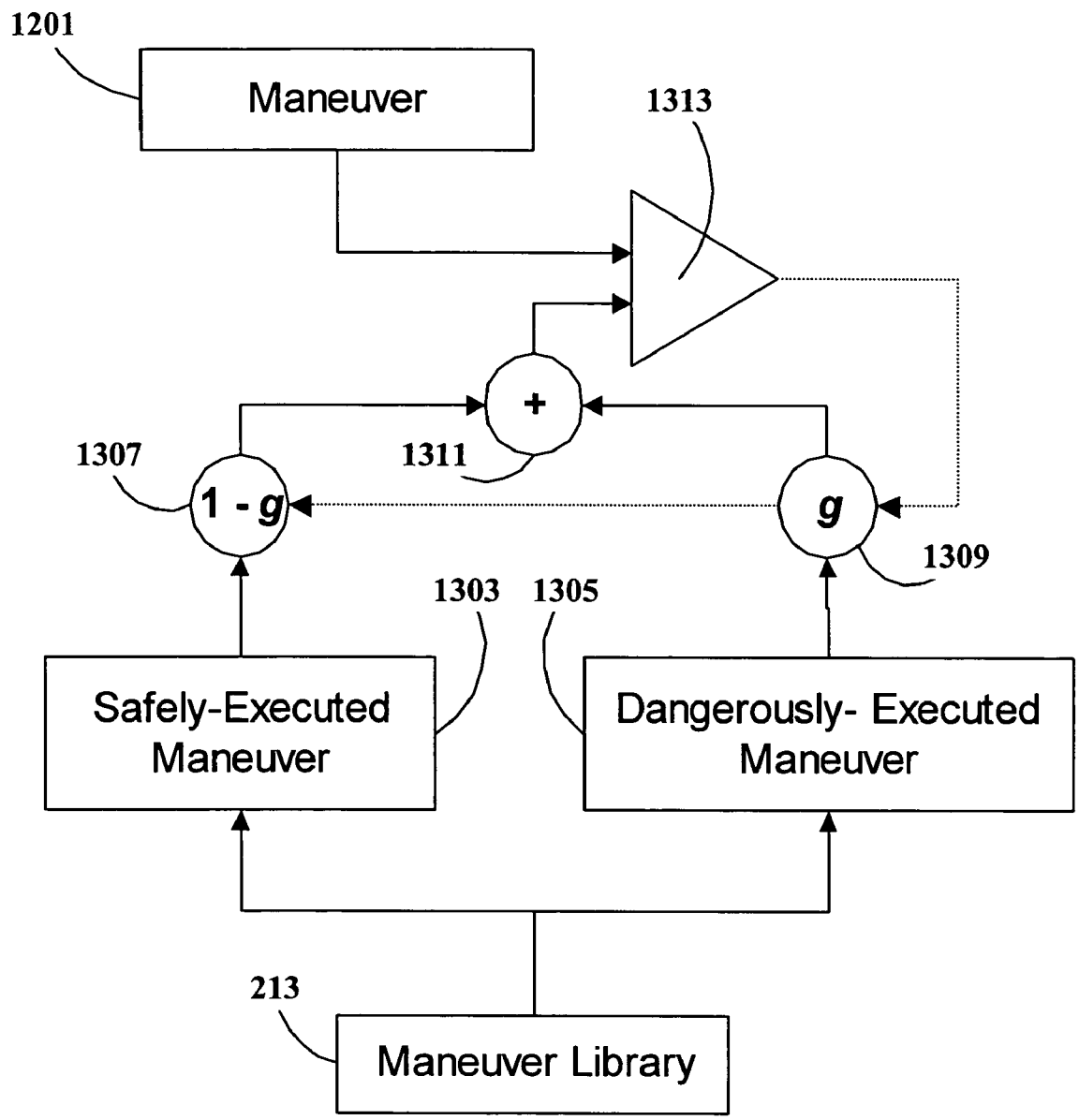
FIG. 13 is a conceptual block diagram of an arrangement for assessing driver attitude according to an embodiment of the present invention.

A similar assessment regarding driver attitude is illustrated in FIG. 13. The templates retrieved from maneuver library 213 are a template 1303 for a safely-executed maneuver corresponding to maneuver 1201, and a template 1305 for a dangerously-executed maneuver corresponding to maneuver 1201. These are combined in a weighted fashion by a multiplier 1309, which multiplies dangerously-executed maneuver 1305 by a factor g, on the interval [0, 1], and a multiplier 1307, which multiplies safely-executed maneuver 1303 by a factor of (1−g). The multiplied maneuvers are added together by an adder 1311, and the combination is compared against maneuver 1201 by a comparator 1313 to find the value of g which yields the closest value to the original maneuver. Thus, g serves as a ranking of the driver's attitude for maneuver 1201, where a value of g=1 represents the greatest degree of danger, and a value of g=0 represents the lowest degree of danger. An intermediate value of g, such as g=0.5 can be interpreted to represent "aggressive" driving, where the driver is taking risks.

As noted, FIG. 13 is a conceptual diagram of a process to assess attitude level for a maneuver. From the perspective of an algorithm or method, the procedure is simply to find the value of g in the interval [0, 1] for which the g-weighted dangerously-executed maneuver template added to a (1−g)-weighted safely-executed maneuver most closely approximates the maneuver in question.

In an embodiment of the present invention, attitude ratings corresponding to many driving maneuvers can be statistically-combined, such as by analyzer 225 (FIG. 2). When statistically combining attitude ratings for different maneuvers according to embodiments of the present invention, note that different maneuvers have different risk coefficients, as shown in Table 1. The more risk a maneuver entails, the higher is the risk coefficient. As a non-limiting example, a driver who performs a Lane Change (risk coefficient=4) with a g=0.3 and then performs a Braking within Turn (risk coefficient=8) with a g=0.7 would have an average driving attitude for these two maneuvers given by:

$$(4*0.3+8*0.7)/2=3.4$$

In another embodiment of the present invention, the assessed attitude of the driver is statistically computed using the maximum (most dangerous) value of the set of maneuvers. For the example above, this would be 8*0.7=5.6.

It is further noted that the factors f and g are arbitrary regarding the choice of the interval [0, 1], and the assignment of meaning to the extremes of the interval. A different interval could be chosen, such as 1-10, for example, with whatever respective meanings are desired for the value 1 and the value 10. Thus, the examples above are non-limiting.

Anomaly Detection

Figure 14:
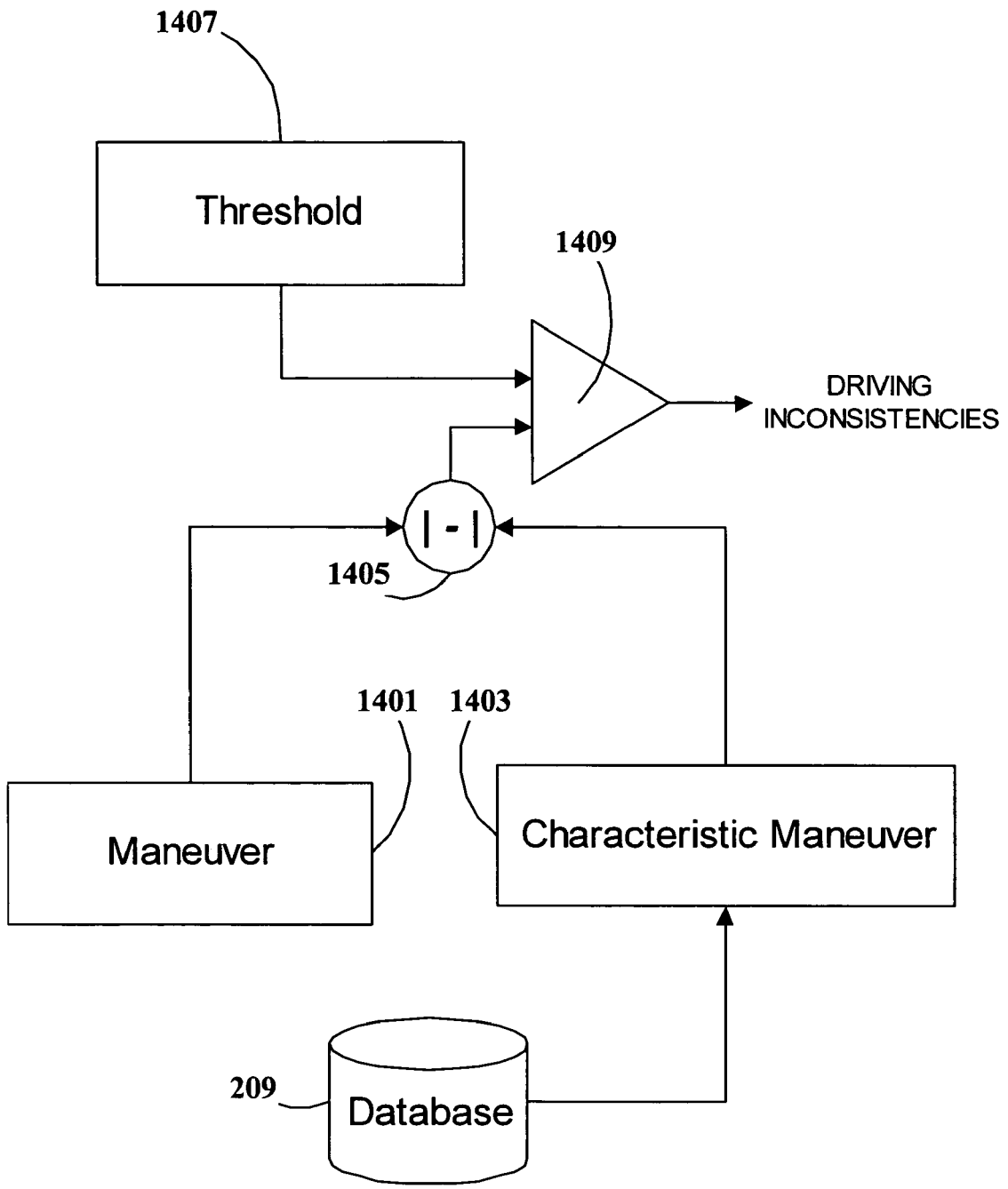
FIG. 14 is a conceptual block diagram of an arrangement for determining whether there is a significant anomaly in the current driver's behavior and/or performance according to an embodiment of the present invention.

FIG. 14 is a conceptual diagram of an arrangement or process according to an embodiment of the present invention for determining whether there is a significant anomaly in the behavior and/or performance of the current driver with reference to that driver's past behavior and performance. A particular driving maneuver 1401 is under scrutiny, and is compared against a characteristic record 1403 of the current driver's past performance of the same maneuver which is considered representative of that driver. Characteristic record 1403 is retrieved from database 209 (FIG. 2). The magnitude of the difference between maneuver 1401 and characteristic maneuver 1403 is obtained by a magnitude subtractor 1405, which outputs the absolute value of the difference. A discriminator 1409 compares the difference magnitude from magnitude subtractor 1405 against a threshold value 1407. If the difference magnitude exceeds threshold value 1407, discriminator 1409 outputs a driving inconsistency signal.

As noted, FIG. 14 is a conceptual diagram of a process to assess discrepancies or anomalies in the performance of a maneuver when compared to a previously-recorded reference. From the perspective of an algorithm or method, the procedure is simply to compare the magnitude of the difference of the maneuver and the previously-recorded reference against a threshold value 1407. If the magnitude of the difference exceeds threshold value 1407, a discrepancy is signaled.

In some cases, such as for inexperienced drivers, it is to be expected that over time the quality of driving may steadily improve. In cases such as this, there may come a point where the driver's performance and/or attitude may improve to the point where his or her driving may exhibit significant anomalies (because of the improvements). Therefore, in an embodiment of the present invention, the system may update the characteristic records in database 209 to account for improved quality of driving.

While the invention has been described with respect to a limited number of embodiments, it will be appreciated that many variations, modifications and other applications of the invention may be made.

The invention claimed is:

1. A system for analyzing and evaluating the performance and behavior of a driver of a vehicle, the system comprising:
   (a) a vehicle sensor utility operative to monitor the state of the vehicle and to output a raw data stream corresponding thereto;
   (b) a driving event handler operative to receive the raw data stream, detect from said raw data stream a plurality of distinctive patterns each associated with a corresponding driving event representation and to output a driving event string containing said driving event representations and their corresponding values; and
   (c) a maneuver detector operative to receive said driving event string, compare a sequence of said driving event representations comprised in the driving event string with patterns of driving maneuvers comprised in a database, to enable recognizing patterns of driving maneuvers in said driving event string and to construct and output a driving maneuver representation corresponding thereto, said driving maneuver representation containing a representation of at least one driving maneuver.

2. The system of claim 1, further comprising: (d) a plurality of vehicle sensors operative to monitor different states of the vehicle, wherein each of said vehicle sensors is operative to output a raw data stream.

3. The system of claim 1, wherein each of the plurality of distinctive patterns is selected from among a group consisting of: (i) a start event; (ii) an end event; (iii) a maximum event; (iv) a minimum event; (v) a cross event; (vi) a flat event; (vii) a local maximum event; and (viii) a local flat event.

4. The system of claim 1, further comprising: (d) a skill assessor operative to analyzing the skill of the driver based upon said at least one driving maneuver.

5. The system of claim 1, further comprising: (d) an attitude assessor operative to analyzing the attitude of the driver based upon said at least one driving maneuver.

6. The system of claim 1, further comprising: (d) a database operative to record characteristic driving maneuvers of the driver; and (e) an anomaly detector operative to compare said characteristic driving maneuvers to said at least one driving maneuver.

7. The system of claim 1, wherein said driving event string provided to said maneuver detector is a compressed representation of said raw data stream.

8. The system of claim 1, wherein said driving event string is transmitted by wireless from the vehicle to said maneuver detector.

9. The system of claim 1, further comprising evaluating means operative to receive values corresponding to a sequence of driving events representations associated with a driving maneuver and derive therefrom an overall risk rating that reflects the risk experienced while carrying out said driving maneuver, and evaluate the performance of the driver of the vehicle based on said risk rating.

10. A method for analyzing and evaluating the performance and behavior of a driver of a vehicle, based on a raw data stream from a set of sensors operative to monitor the state of the vehicle, the method comprising:
    (a) detecting from said raw data stream a plurality of distinctive patterns each associated with a corresponding driving event representation and generating a driving event string containing said driving event representations and their corresponding values; and
    (b) comparing a sequence of said driving events representations comprised in the driving event string with patterns of driving maneuvers comprised in a database, recognizing patterns of driving maneuvers in said driving event string and generating a driving maneuver representation containing a representation of at least one driving maneuver.

11. The method of claim 10, furthermore comprising:
    (c) assessing driver skill, based on said driving maneuvers.

12. The method of claim 10, furthermore comprising:
    (c) assessing driver attitude, based on said driving maneuvers.

13. The method of claim 10, wherein each of the plurality of distinctive patterns is selected from among a group consisting of: start event, an end event, a maximum event, a minimum event, a cross event, a local maximum event, a local minimum event, a local flat event and a flat event.

14. The method of claim 10, wherein said driving event string is a compressed representation of said raw data stream.

15. The method of claim 10, further comprising a step of receiving values corresponding to a sequence of driving events representations associated with a driving maneuver and deriving therefrom an overall risk rating that reflects the risk experienced while carrying out said driving maneuver, and evaluating the performance of the driver of the vehicle based on said risk rating.

* * * * *